United States Patent [19]
Grat

[11] Patent Number: 5,912,035
[45] Date of Patent: Jun. 15, 1999

[54] METHOD AND APPARATUS FOR FORMING FOLDED FOOD PRODUCTS

[75] Inventor: Felix R. Grat, Parsippany, N.J.

[73] Assignee: Howden Food Equipment, Inc., Boston, Mass.

[21] Appl. No.: 08/881,352

[22] Filed: Jun. 24, 1997

[51] Int. Cl.[6] .................................................. A21C 9/08
[52] U.S. Cl. .......................... 426/297; 426/138; 426/502; 426/512; 426/514; 426/496; 99/450.1; 99/450.2; 99/450.6
[58] Field of Search ..................................... 426/138, 297, 426/502, 512, 514, 496, 500; 99/450.1, 450.2, 450.6, 450.7

[56] References Cited

U.S. PATENT DOCUMENTS

| | | | |
|---|---|---|---|
| 3,669,007 | 6/1972 | Pulici | 426/297 X |
| 3,912,433 | 10/1975 | Ma | 99/450.6 X |
| 3,920,440 | 11/1975 | Ohkawa | 99/450.6 |
| 4,084,493 | 4/1978 | Quintana | 426/297 X |
| 4,388,059 | 6/1983 | Ma | 99/450.6 X |
| 4,393,758 | 7/1983 | Anmahian | 99/450.7 X |
| 4,457,225 | 7/1984 | Bakker | 426/502 X |
| 4,483,242 | 11/1984 | Goodman et al. | 99/450.7 X |
| 4,516,487 | 5/1985 | Madison et al. | 99/450.7 X |
| 4,608,919 | 9/1986 | Prows et al. | 99/450.6 |
| 4,638,729 | 1/1987 | Woodworth et al. | 99/450.7 X |
| 4,691,627 | 9/1987 | Roberts | 99/450.7 X |
| 4,913,043 | 4/1990 | Cheung | 99/450.7 X |
| 4,938,981 | 7/1990 | Hee | 426/502 X |
| 4,961,948 | 10/1990 | Hee | 426/502 X |
| 5,263,407 | 11/1993 | Pomara, Jr. | 99/450.7 X |

*Primary Examiner*—Milton Cano
*Attorney, Agent, or Firm*—John Q. McQuillan

[57] ABSTRACT

Elimination of the problems of a manual burrito folding operation is obtained by a high speed burrito folding machine which eliminates the need for human operators. The machine includes an endless conveyor having an entrance portion, an intermediate portion downstream of the entrance portion, and an exit portion downstream of the intermediate portion. A plurality of platform assemblies are pivotally mounted on the conveyor about a substantially vertical axis and spaced apart from one another. The swinging of a first movable platform of each platform assembly sequentially forms a first fold in each burrito. Downstream of the forming of the first fold, each burrito is sequentially revolved to a position in which the axis of the first fold is substantially transverse to the length of the conveyor. Each of a pair of spaced apart portions of the burrito are folded to form spaced apart second and third folds in the burrito which extend along fold lines which are transverse to the first fold. At the exit portion of the conveyor, each thrice-folded burritos are transferred to an the additional conveyor upon which the thrice-folded burritos are folded around a substantially horizontal axis extending transverse to the length of the additional conveyor to provide fourth and final folds to the burrito as it approaches the exit portion of the additional conveyor.

12 Claims, 13 Drawing Sheets

METHOD AND APPARATUS FOR FORMING FOLDED FOOD PRODUCTS

BACKGROUND OF THE INVENTION

1. Field of the Invention

The invention relates to a method and apparatus for forming folded food products in which the food products are placed in flat form upon platforms mounted upon a conveyor and where the food product is subjected to a series of folding operations before the final folded form of the food product is released from the machine. In particular, the folded food product may comprise a burrito which comprises a flour tortilla folded around a filling such as meat, beans, or cheese and which may subsequently be baked.

2. Description of the Prior Art

The present method of folding burritos is a manual folding operation which is labor intensive and involves a high degree of dexterity. At the beginning of a manual burrito folding operation, a tortilla which is a round, thin cake of corn meal or wheat flour bread is placed upon a conveyor. The tortilla or shell is advanced by the conveyor to a depositor which supplies a filling such as ground meat, beans, or cheese to the central portion of the shell. The filling can be off center with respect to the center of the shell. A first fold of the shell is then made by which the filling is covered. The shell is then subjected to the forming of second and third folds which extend substantially perpendicular to the fold line of the first fold. Next the portion of the shell adjacent the first fold line is subjected to a fourth fold which enables the exposed portions of the shell resulting from the second and third folds to be partially covered. The final fold which is again parallel to the fold line of the first fold is then made. The finished burrito is then prepared for either freezing or baking.

Typically four folding operators can produced approximately 120 burritos per minute on a single production line. The manual burrito folding operation inherently limits the production rate due to the necessity to carry out all of the folding operations by hand. Furthermore, since hand-work is involved, the quality and uniformity of the burritos being made necessarily varies.

SUMMARY OF THE INVENTION

The present inventions solves the problems of a manual burrito folding operation by providing a high speed burrito folding machine which eliminates the need for human operators in the folding operation. In accordance with the invention, the machine is provided with an elongated frame extending throughout the length of the machine with an endless conveyor mounted upon the frame and extending along the length thereof. The conveyor has an exposed upper run extending horizontally in a plane adjacent the upper portion of the machine. The upper run includes an entrance portion, an intermediate portion downstream of the entrance portion, and an exit portion downstream of the intermediate portion. The conveyor is driven with the upper run advancing from the entrance portion toward the exit portion.

A plurality of platform assemblies is provided with each being pivotally mounted on the conveyor about a substantially vertical axis when on the upper run. Each of the platform assemblies is spaced apart from one another along the length of the conveyor and has a substantially horizontally extending planar base platform section when the platform assembly is on the upper run. There is provided a first movable platform section pivotally mounted about a pivotal axis extending adjacent to and parallel with respect to an edge portion of the planar base platform section. There is also included a pair of second movable platform sections oppositely disposed with respect to one another. Each of the second movable platform sections is pivotally mounted about a different one of a pair of substantially parallel pivotal axes with respect to a different oppositely disposed edge portion of the planar base platform section. The pivotal axes of the second movable platform sections extend substantially perpendicular to the pivotal axis of the first movable platform section. Each of the plurality of the platform assemblies when adjacent the entrance portion of the upper run of the conveyor are adapted to receive a flat food product, for example a burrito shell and filling, which is to be folded.

Means are disposed on the upper run of the conveyor downstream from entrance portion for sequentially swinging the first movable platform section from a substantial horizontal position to a position overlying and adjacent to at least a portion of the planar base platform section and at least a portion each of the second movable platform sections. The swinging of the first movable platform forming a first fold in the burrito. Means are provided to return the first movable platform section to a substantially horizontal position. Means are provided downstream of the returning means for sequentially revolving each of the platform assemblies to a position in which the pivotal axis thereof is substantially transverse to the length of the conveyor and the pivotal axis of each of the second movable platform sections is substantially parallel to the length of the conveyor.

Means are provided for sequentially rotating each of the pair of second movable platform sections to a position overlying and adjacent to at least a portion of the planar base platform section, thereby forming spaced apart second and third folds in the burrito which extend along fold lines which are transverse to the first fold. Means are provided for sequentially returning each of the second movable platform section to a substantially horizontal position.

There is provided an additional endless conveyor extending in line with the length of the endless conveyor and downstream and lower than the exit portion of the endless conveyor. Thus, the additional endless conveyor has an entrance portion adjacent the exit portion of the endless conveyor, an intermediate portion and exit portion.

Means are provided adjacent to the exit portion of the conveyor for sequentially transferring each thrice-folded burrito from the platform assembly to the upper run of the additional conveyor adjacent the entrance portion thereof. Means are provided adjacent the intermediate portion of the upper run of the additional conveyor for folding the thrice-folded burrito around a substantially horizontal axis extending transverse to the length of the upper run of the additional conveyor. In this way the fourth and final folds are provided to the burrito as it approaches the exit portion of the upper run of the additional conveyor.

It is an object of an invention to provide a method and apparatus for forming folded food products such as burritos in place of a manual folding operation.

It is a further object of the invention to provide a method and apparatus by which a food product is subjected to a sequence of folds while being advanced on a conveyor including a first fold, second and third folds together, and finally fourth and fifth folds to complete the food product.

It is still a further object of the method and apparatus of the invention to receive a food product in an original flat form and to subject the food product to a sequence of folding operations while being conveyed in order to obtain a final folded food product.

It is an additional object of the method and apparatus of the invention to initiate the folding of a food product on one conveyor and to complete the folding on a second conveyor extending downstream of the first conveyor.

It is also an object of the method and apparatus of the invention to perform the sequentially folding of a food product on each of a plurality of parallel extending conveyors.

These and other objects and additional elements, features, and advantages of the method and apparatus of the invention will become more apparent from the following detailed description taken in conjunction with the accompanying drawings.

DETAILED DESCRIPTION OF THE PREFERRED EMBODIMENTS

Figure 1:
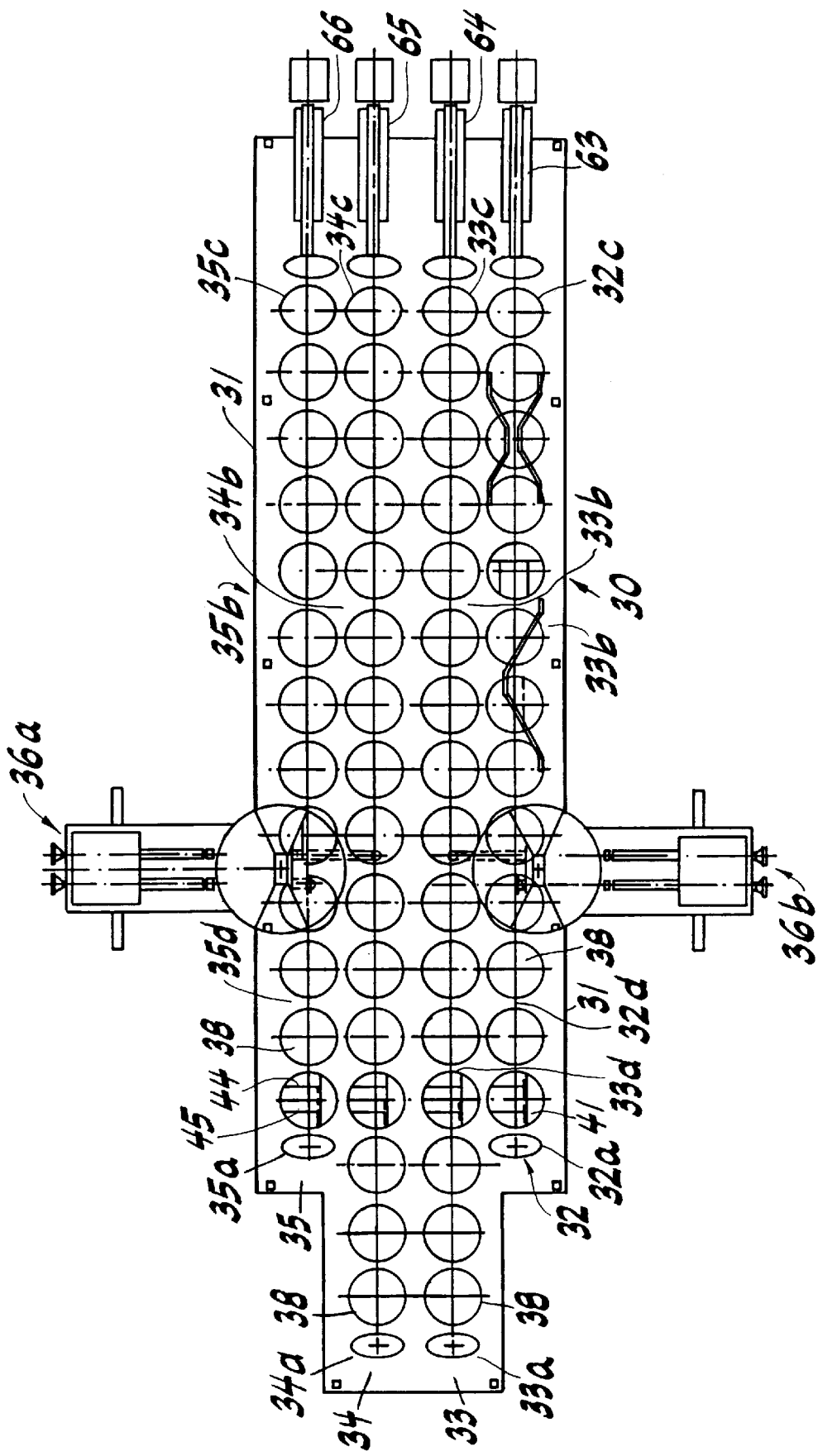
FIG. 1 is a plan view of the machine for forming folded food products with the entrance portion of the machine shown at the left in the drawing and the exit portion of the machine shown at the right in the drawing.

In FIG. 1 there is shown machine 30 for folding food products such as burritos. Machine 30 includes an elongated frame 31 extending throughout the length of the machine. The machine includes a plurality of endless conveyors 32–35. Endless conveyors 32 and 35 have entrance portions 32a and 35a, respectively. Endless conveyors 33 and 34 have entrance portions 33a and 34a, respectively. Again as shown in FIG. 1, endless conveyors 32–35 have an intermediate portion 32b–35b, respectively. Conveyors 32–35 also include exit portions 32c–35c, respectively. Each of the endless conveyors 32–35 includes an endless chain 32a–32d, respectively, schematically shown in FIG. 1 having an upper run extending horizontally in a plane adjacent the upper portion of the machine 30.

Drive units (not shown) are coupled to the chains of endless conveyors 32 and 33, respectively, to drive the endless conveyors from their entrance portions, through their intermediate portions, and toward their exit portions thereof. Similarly drive units (not shown) are connected to drive endless conveyor 34 and endless conveyor 35, respectively.

Figure 2:
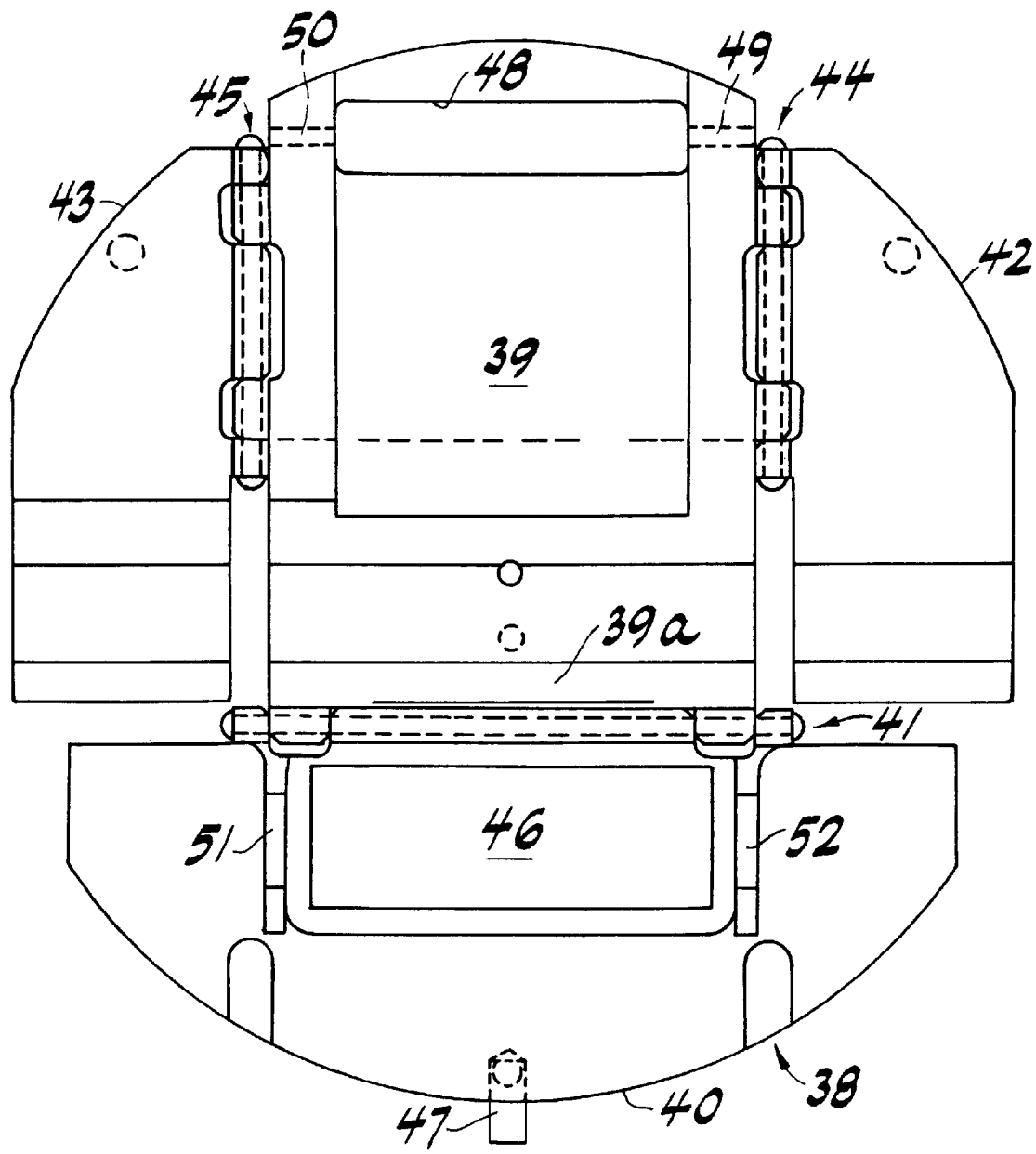
FIG. 2 is a plan view of one of the plurality of platform assemblies which are mounted on each of the conveyors of the machine.

Each of the endless conveyors 32–35 are provided with a plurality of platform assemblies 38 shown in FIG. 2. Each platform assembly 38 is approximately circular in form as shown in FIG. 2 and as represented by circles on the endless conveyors 32–35 as shown in FIG. 1. Each platform assembly 38 includes a planar base platform section 39 and a first removable platform section 40 which is pivotally mounted about pivotal axis 41 with respect to edge portion 39a of the planar base platform section. Each platform assembly 38 further includes a pair of second movable platform sections 42 and 43 which are pivotally mounted about pivotal axes 44 and 45, respectively. First movabile platform section 40 includes pocket 46. The first movable platform section further includes a U-shaped follower 47, extending beyond the periphery of the first movable platform section. The planar base platform section 39 has opening 48 therein from which extends sockets 49 and 50.

In FIG. 1 adjacent the entrance portion 32a–35a of the conveyors 32–35, there is space for the positioning of four loading personnel (not shown) for delivering the tortillas or shells 56 to the platform assemblies 38 on each of the conveyors adjacent the entrance portion of each of the conveyors. Thus the tortillas or shells 37 are placed by the loading personnel on each of the platform assemblies 38 of each of the conveyors 32–35. Further as shown in FIG. 1, the platform assemblies 38 when adjacent the entrance portions of the conveyors are positioned with the first movable platform section of each disposed with the pivotal axis thereof, pivotal axis 41, extending in line with the length of the respective conveyor. Accordingly, the pivotal axes 44 and 45 of the second movable platform sections 42 and 43, respectively, extend substantially transverse to the length of the respective conveyor.

Figure 3:
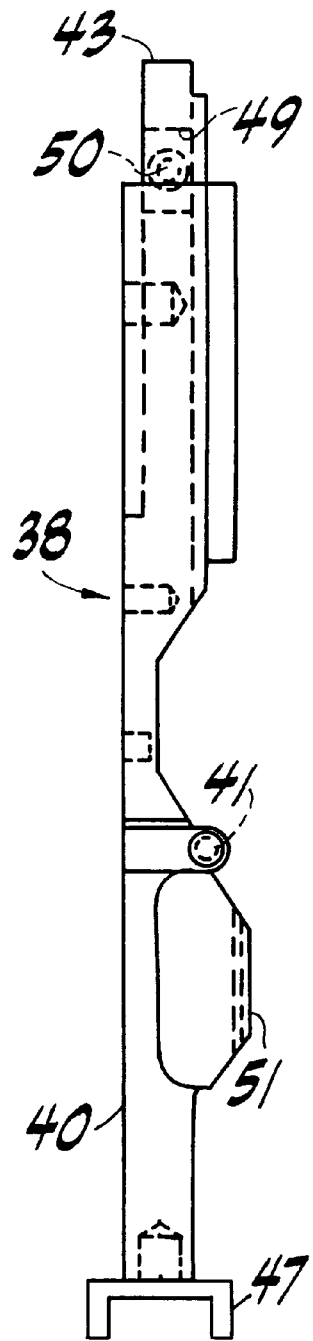
FIG. 3 is an elevation view of the platform assembly shown in FIG. 2.

FIG. 3 is an elevation view of the platform assembly 38 as viewed from the left hand portion of FIG. 2 of the drawings. Uprights 51 and 52 are oppositely disposed with respect to packet 46 as shown in FIG. 2. FIG. 3 which is an elevation view of FIG. 2 taken from the left hand portion of FIG. 2 shows upright 51.

Filling depositor 36a in FIG. 1 is a dual output device which deposits filling 37a (not shown in FIG. 1) upon tortillas or shells 37. Thus depositor 36a deposits filling 37a such as meat, beans, or cheese upon the tortillas or shells 37 when the tortillas or shells are disposed on platform assemblies 38 upon conveyors 32 and 33. Similarly, depositor 36b deposits filling 37a on tortillas or shells 37 when the tortillas or shells 37 are disposed upon platform assemblies 38 of conveyors 34 and 35.

Figure 4:
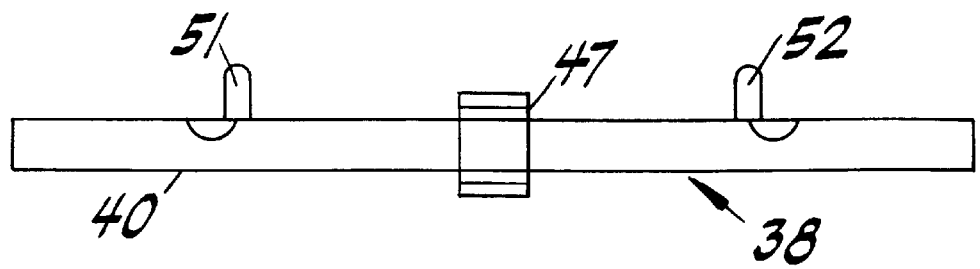
FIG. 4 is an elevation view of the first movable platform section of the platform assembly shown at the lower portion of FIG. 2.

FIG. 4 is an elevation view of first movable platform section 40 when viewed from the bottom portion of FIG. 2. FIG. 4 also shows U-shaped follower 47 and uprights 51 and 52.

Figure 5:
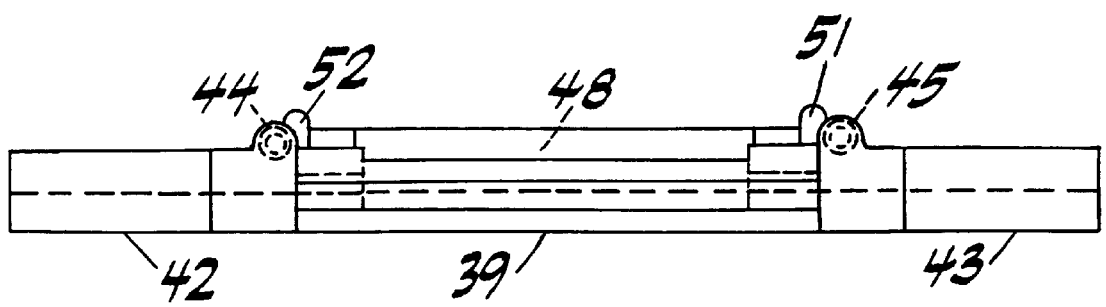
FIG. 5 is an elevation view of the planar base platform section and an elevation view of the pair of second movable platform sections of the platform assembly shown in FIG. 2 when viewed at the upper portion of FIG. 2.

FIG. 5 is an elevation view of the planar base portion platform section 39 and second movable platform sections 42 and 43 with the pivotal axes 44 and 45, respectively.

Figure 6:
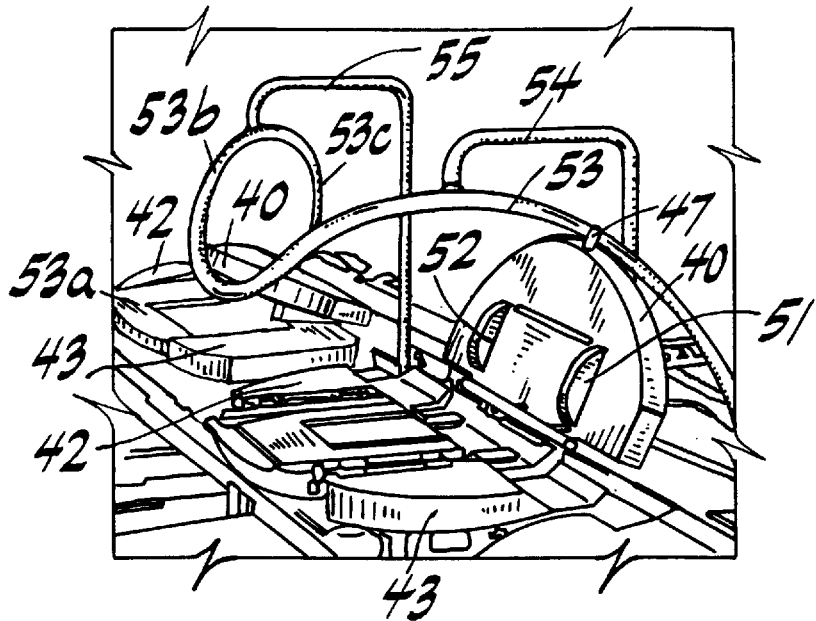
FIG. 6 is an isometric view showing a first movable platform section of a platform assembly being swung from a substantially horizontal position to a position overlying and adjacent to at least a portion of the planar base platform section and at least a portion of each of the second movable platform sections.

As shown in FIG. 6, a platform assembly 38 is shown entering the intermediate portion of the conveyor with the first movable platform section 40 being progressly elevated from the initial horizontal position thereof. In FIG. 6, a tortilla or shell 37 with filling is not shown disposed upon the platform assembly 38. Follower 47 engages rod-like cam 53, supported by stations 54 and 55. Follower 47 which is U-shaped engages spiral-shaped rod-like cam 53 and causes the first movable platform section 40 to be elevated progressively from its original horizontal position, through a vertical position as determined by the lower portion 53a of cam 53, and to a position overlying a portion of the planar base platform section 39 and at least a portion each of the second movable platform sections 42 and 43.

In FIG. 6, the platform assembly 38 at the left as viewed in FIG. 6, that is downstream of the platform assembly 38 to the right as viewed in FIG. 6, shows the first movable platform section 40 approaching a near horizontal position which causes the formation of the first fold in the tortilla or shell with filling when (not shown in FIG. 6) disposed upon the platform assembly. As shown in FIG. 6, the lower portion 53a of cam 53 sets the lowest point to which the first movable platform section 40 is serving when producing the first fold in a tortilla or shell.

In portion 53b of rod-like cam 53, follower 47 follows the upper extent of cam 53 and commences to return, i.e. elevate, the first movable platform section 40 away from the folded tortilla or shell. As the follower 47 advances to portion 53c of rod-like cam 53, the first movable platform section 40 is returned or lowered to its original substantially horizontal position. At this point follower 47 is released from engagement with the rod-like cam 53.

Figure 7:
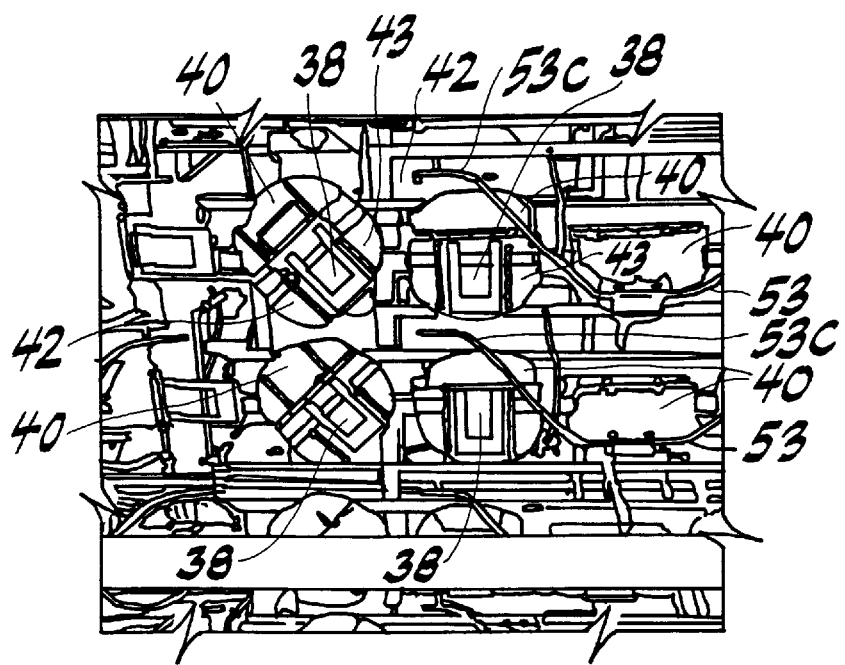
FIG. 7 is a plan view of a first movable platform section being returned to a substantially horizontal position and showing the platform assembly downstream thereof commencing to be rotated with respect to the line of travel of the conveyor.

In FIG. 7 shows two endless conveyors and two platform assemblies 38 on each. At the left portion of FIG. 7, the first movable platform section 40 on each conveyor is shown in the lower horizontal position in which it is completing the formation of the first fold of a tortilla or shell. In the central portion of FIG. 7, the first movable platforms 40 are shown elevated by cam 53 while being returned to their original substantially horizontal position.

Figure 8:
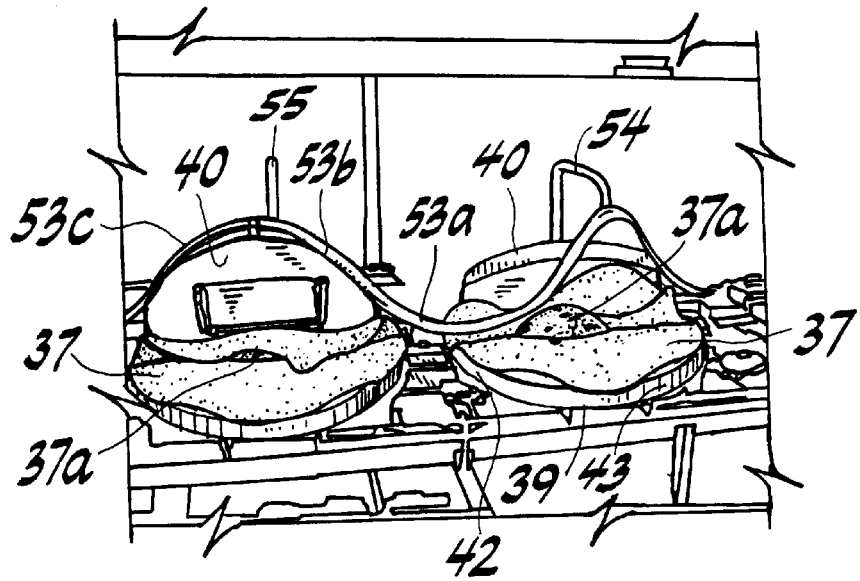
FIG. 8 is an isometric view showing a first movable platform section being returned to a substantially horizontal position after a shell of a burrito disposed on the platform assembly has been provided with a first fold.

In the right hand portion of FIG. 8, there is shown tortilla or shell 37 with filling 37a on the shell 37 being disposed upon platform assembly 38 with first movable platform 40 folding shell 37. In the left hand portion of FIG. 8, it can be seen that section 53b of the rod-like cam 53 in engagement with the follower 47 of the first movable platform section 40 is returning, i.e. elevating, the first platform section 40, leaving the shell 37 folded over filling 37a.

Figure 9:
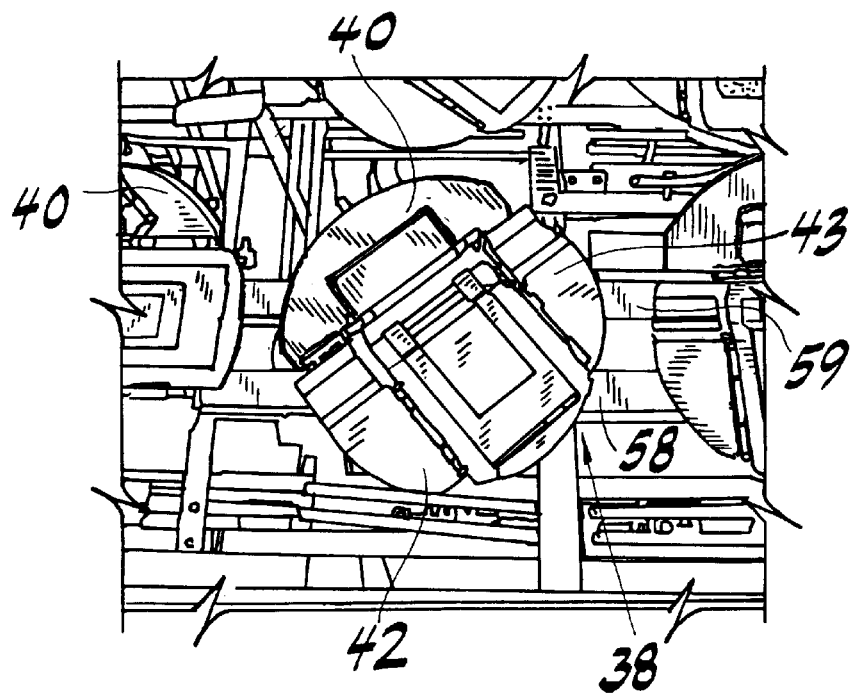
FIG. 9 is a detailed portion of the plan view of FIG. 7 showing a platform assembly being rotated with respect to the line of travel of the conveyor.

FIG. 9, as in the left hand portion of FIG. 7, shows platform assembly 38 being rotated in counterclockwise direction as viewed in FIG. 9. In FIG. 9 there are shown tracks 58 and 59 extending beneath the platform assembly 38. The tracks which are in engagement with the bottom portion of the platform assembly 38, stabilize the platform assembly which is pivotal mounted upon the chain of the conveyor. Pins (not shown) extending beneath the second movable platform sections 42 and 43 when engaging a fixed element (not shown) on the frame of the machine adjacent the conveyor, cause the rotational movement of the platform assembly 38. In FIG. 7 as in FIG. 9, the rotation of the platform assembly 38 is shown in progress.

Figure 10:
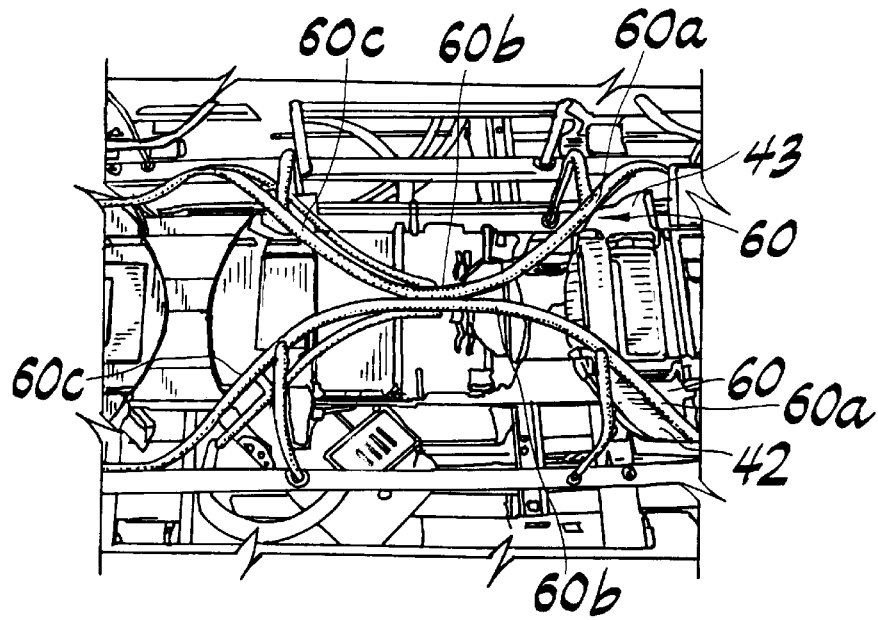
FIG. 10 is a plan view showing a platform assembly after the completion of rotation with respect to the line of travel of the conveyor with the second movable platform sections performing the second and third folds of the shell of a burrito.

At the right hand portion of FIG. 10, there is shown platform assembly 38 with second moveable platform sections 42 and 43 engaging the entrance portion of spiral-shaped rod-like cams 60. The entrance portions 60a of the rod-like cams 60 commence to elevate each of the second movable platform sections 42 and 43. The highest point of elevation is reached at the intermediate portions 60b of the rod-like cams at which point the second movable platform sections are substantially vertical. Subsequently, at the exit portions 60c of cams 60, each of the second movable platforms 42 and 43 are lowered to their original substantially horizontal positions. The result is that a burrito when disposed on platform assembly 38 is folded with second and third folds extending parallel to the line of travel of the platform assembly 38 and transverse to the first fold of the burrito which was accomplished by the swinging action of the first movable platform section 40.

Figure 11:
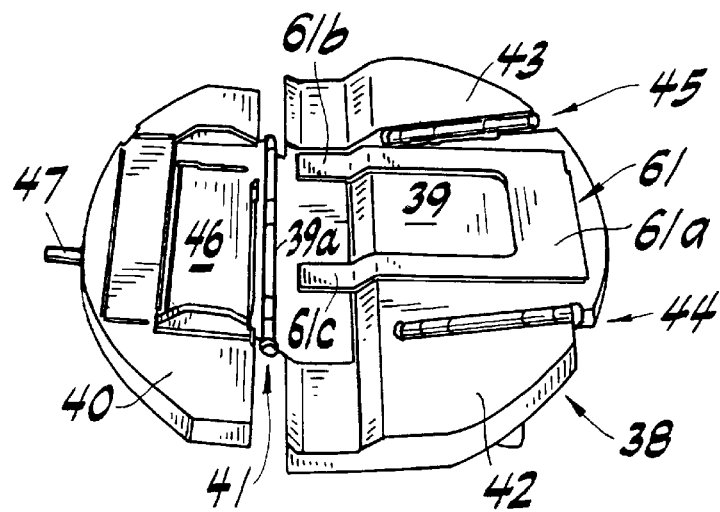
FIG. 11 is an isometric view of one of the plurality of platform assemblies mounted on the conveyor and showing the lift arm pivotally mounted on the planar base platform section for transferring a partially folded burrito from the planar base platform section at the exit portion of the conveyor.

In FIG. 11, platform assembly 38 is shown with lift arm 61 having base portion 61a and arms 61b and 61c. Lift arm 61 has base portion 61a overlying opening 48 shown in FIG. 2. The lift arm 61 is pivotally mounted with respect to sockets 49 and 50 shown in FIG. 2.

Figure 12:
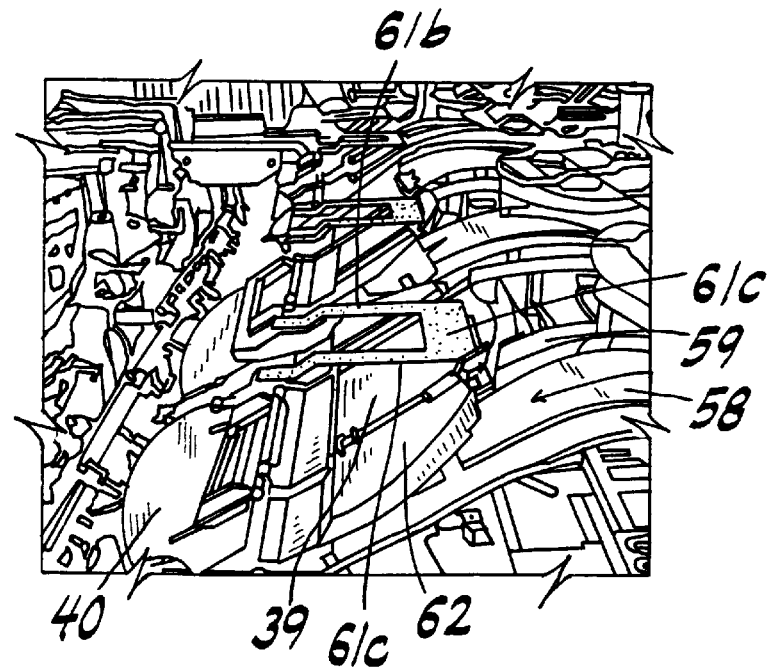
FIG. 12 is an isometric view of the exit portion of several of the parallel extending conveyors showing the lift arm of each platform assembly being raised with respect to the planar base platform section to transfer the partially folded burrito from the platform assembly.

FIG. 12 shows the exit portions 32c–35c of the conveyors 32–35. At the exit portions 32c–35c, projections (not shown) extend through the openings 48 in the planar base portion platform section 39 of each platform assembly 38, engage the lower surface of base 61a of each of the lift arms 61, and elevate the arms 61b and 61c of each lift arm 61 with respect to the planar base portion 39. Thus lift arms 61 on the platform assemblies 38 serve as the means for transferring the thrice-folded burritos 62 to additional conveyors 63–66 shown in FIG. 1. Conveyors 63–66 can be smooth belt conveyors.

Figure 13:
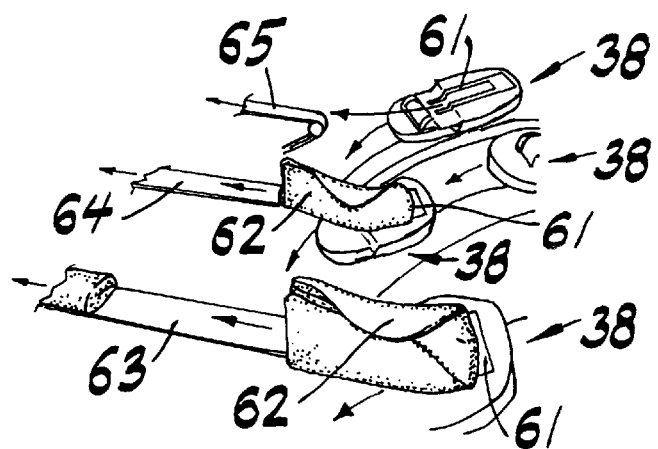
FIG. 13 is an isometric view of the exit portion of the conveyor showing the partially folded burritos being transferred from the exit portion of the conveyors to the entrance portion of the additional conveyors.

Smooth belt conveyors 63–65 are shown in FIG. 13. As further shown in FIG. 13, thrice-folded burritos 62 are transferred by lift arms 61 from platform assembly 38 to smooth belt conveyors 63–65. The final folds of burritos 62 take place on the smooth belt conveyors.

Figure 14:
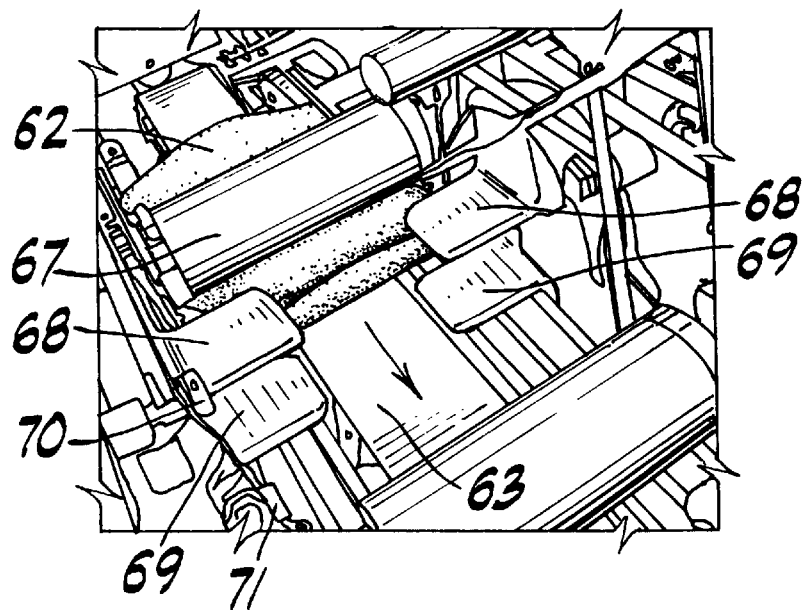
FIG. 14 is an isometric view showing a partially folded burrito before entering a first set of jaws which will initiate the turning of the partially folded burrito.

As shown in FIG. 14, adjustable driven roller 67 applies slight pressure to the partially folded burrito 62 before the burrito enters the first set of a pair of folding jaws 68 and a pair of folding jaws 69. Each set of folding jaws is equipped with sensors to detect the arrival of a burrito 62. As shown in FIG. 14, the pair of folding jaws 68 has sensor 70 while the pair of folding jaws 69 has sensor 71.

Figure 15:
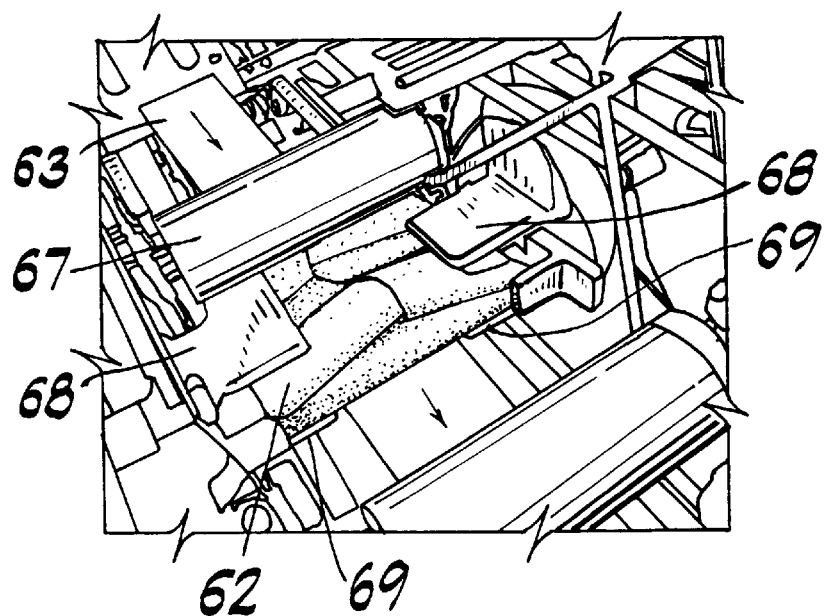
FIG. 15 shows a partially folded burrito entered within the first set of jaws which will turn the partially folded burrito.

As shown in FIG. 15, burrito 62 is disposed between the first set of a pair of folding jaws 68 and a pair of folding jaws 69 which are about to grip the burrito.

Figure 16:
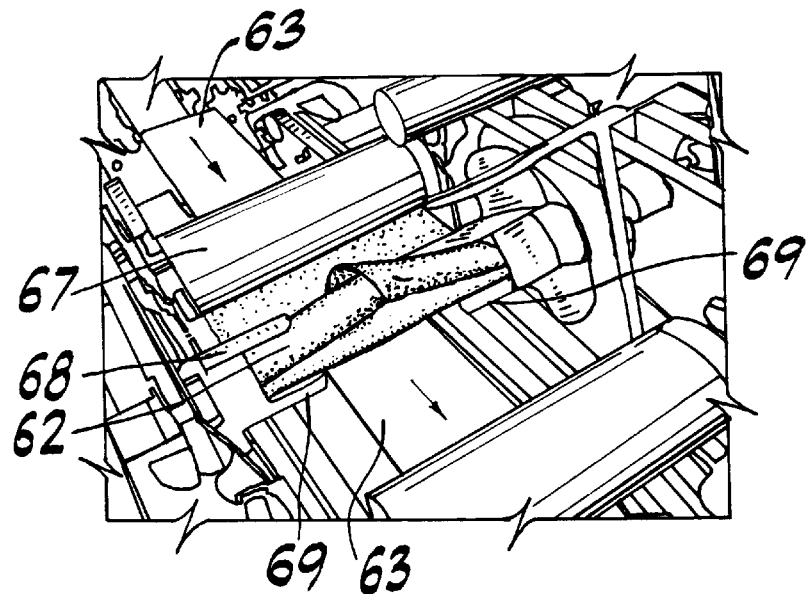
FIG. 16 is an isometric view showing the first set of jaws gripping the partially folded burrito and commencing the turning of the partially folded burrito.

As shown in FIG. 16, the pairs of folding jaws 68 and 69 grip burrito 62 and commence to rotate the burrito in a counterclockwise direction when viewed from the left portion of FIG. 16. The surface speed of the burrito 62 when rotated by the folding jaws 68 and 69 is slightly faster than the surface speed of additional smooth conveyor 63 and thereby the speed of travel of the burrito 62. The slightly faster speed of the rotating burrito 62 as compared to the speed of the smooth conveyor 63 contributes to and controls the tightness of the finished burrito. If the finished burrito lacks such tightness and is "too loose", it is ranked as an inferior product.

Figure 17:
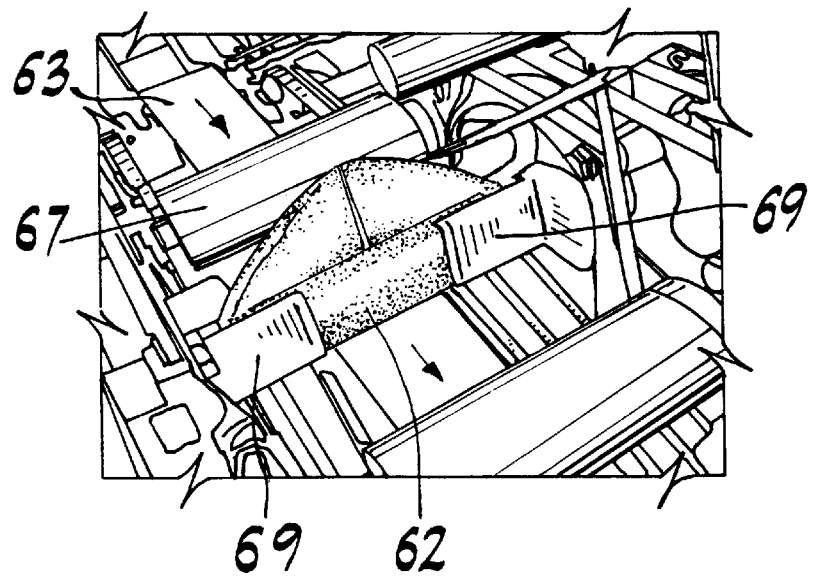
FIG. 17 is an isometric view showing the partially folded burrito being turned by the first set of jaws.

In FIG. 17 the turning cycle of burrito 62 continues.

Figure 18:
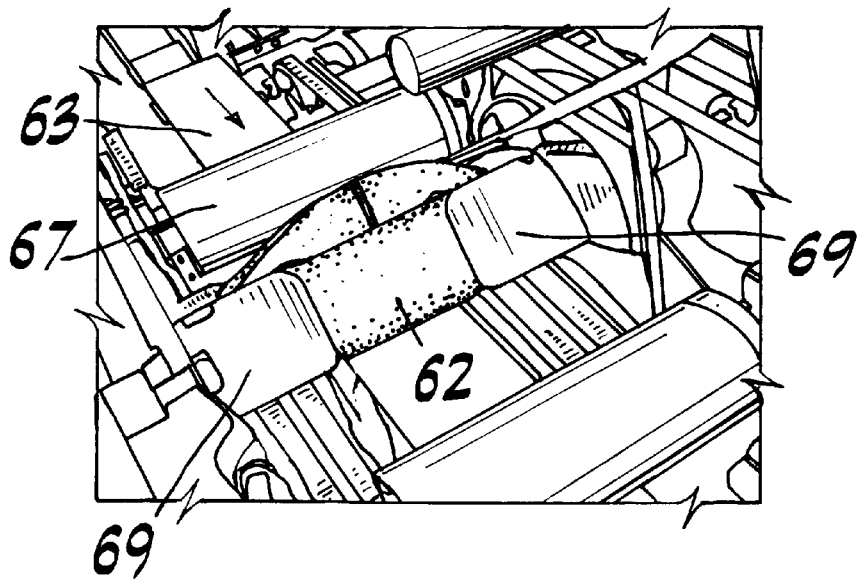
FIG. 18 is an isometric view showing the first set of jaws continuing the turning of the burrito past 90 degrees.

In FIG. 18 the turning cycle of burrito 62 extends past 90 degrees.

Figure 19:
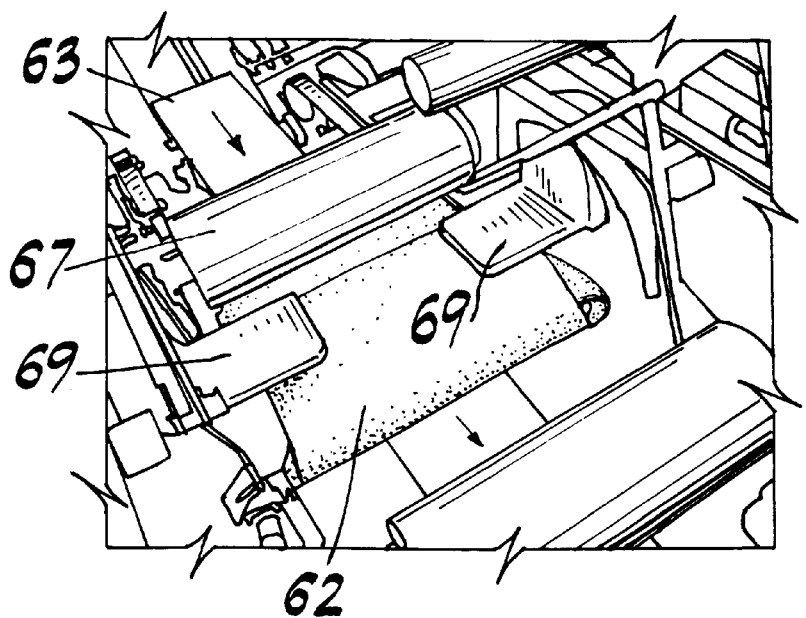
FIG. 19 is an isometric view showing the partially folded burrito being rolled to the extent of 180 degrees.

As shown in FIG. 19, burrito 62 has been rotated by the pairs of jaws 68 and 69 to the extent of 180 degrees.

Figure 20:
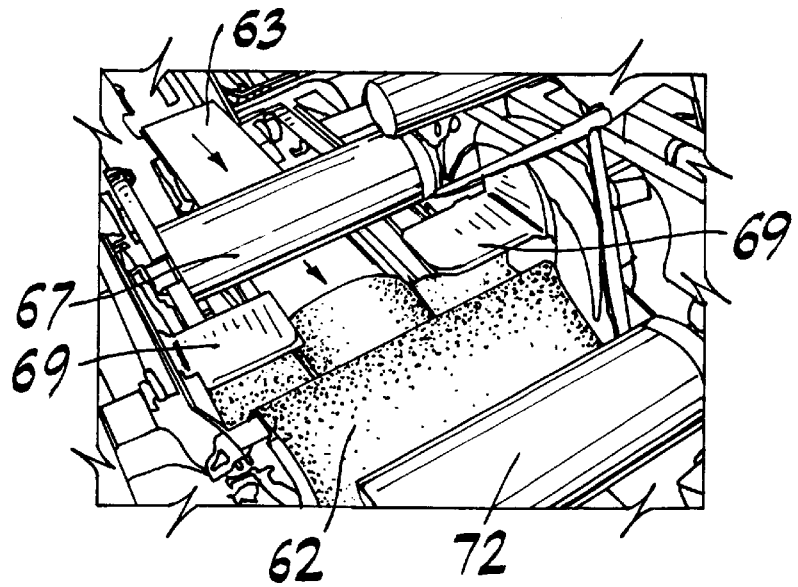
FIG. 20 is an isometric view showing the rolled burrito being released from the first set of jaws.

In FIG. 20, burrito 62 is shown being released from the pairs of jaws including jaws 69 and continues to advance on smooth conveyor 63 toward the second adjustable driven roller 72 by which the final fold of burrito 62 is to be formed.

Figure 21:
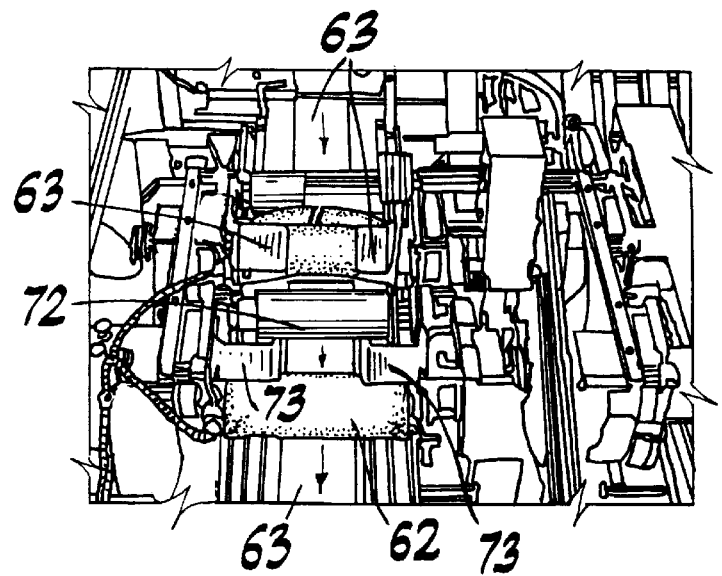
FIG. 21 is an isometric view of the intermediate portion of the additional conveyor showing the second set of jaws completing the final fold of a burrito.

FIG. 21 shows the final fold of burrito 62 being formed by rotating the burrito when engaged with two pairs of folding jaws including the pair of folding jaws 73. Again the surface speed of the burrito 62 when rotated by the folding jaws 73 is slightly faster than the surface speed of smooth conveyor 63 to achieve tightened the finished burrito.

Figure 22:
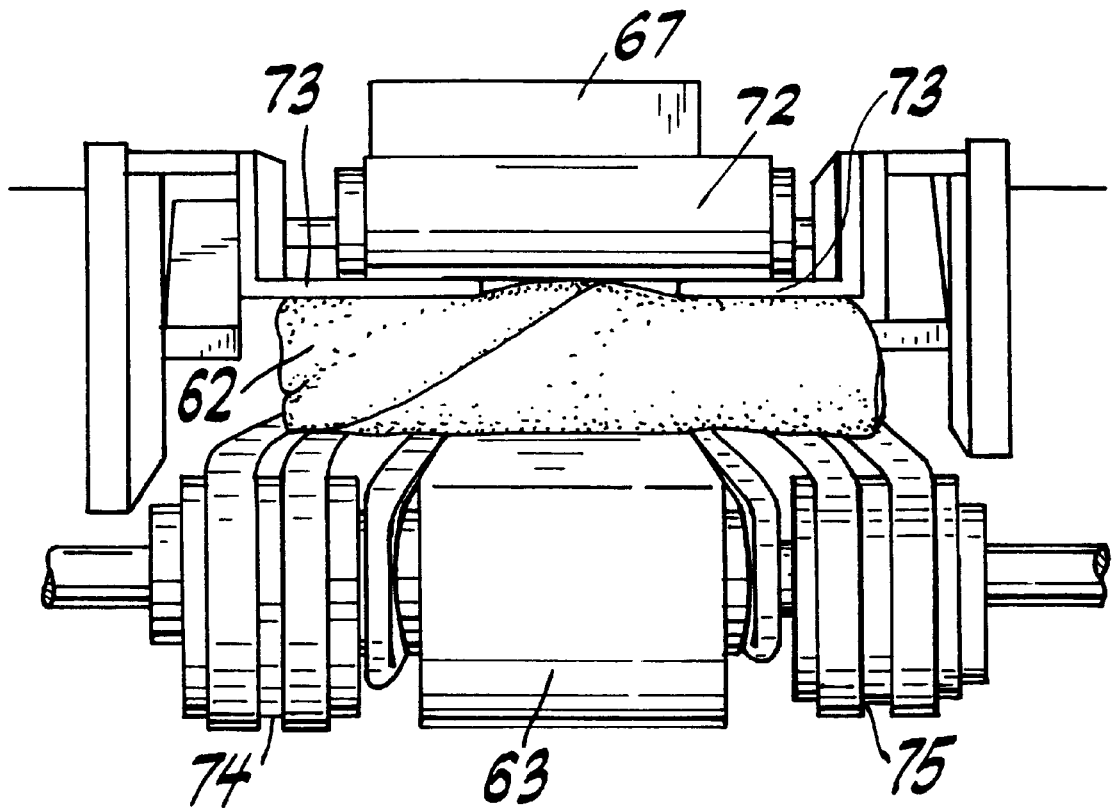
FIG. 22 is an elevation view of the exit portion of the additional conveyor showing the finished form of the folded burrito.

As shown in FIG. 22 the finished burrito 62 passes from beneath jaws 73 and approaches the exit portion of smooth belt conveyor 63. Rollers 74 and 75 facilitate the release of the finished burrito 62 from smooth belt conveyor 63.

Although the above description is of the presently preferred embodiment of the invention, a person of skill in the art will recognize that many changes can be made in the structure and arrangement of the method and machine within the scope of the invention.

What is claimed is:

1. A method for forming folded food products comprising the steps of conveying a series of food products each disposed on a rotatable platform spaced apart from the platforms adjacent thereto along a run of the spaced rotatable platforms extending in a horizontal plane and having an entrance portion, an intermediate portion downstream of the entrance portion, and an exit portion downstream of the intermediate portion, each of the food products being conveyed from the entrance portion toward the exit portion of the run, each of the food products on the rotatable platforms being spaced apart from one another along the length of the run, each of the food products to be folded being introduced to the rotatable platforms in flat form at the entrance portion of the run, downstream from the entrance portion sequentially swinging a peripheral portion of the rotatable platforms for sequentially folding a portion of each food product about an axis extending parallel to the length of the run from a substantially horizontal position of each of the food products on the rotatable platform to a position overlying and adjacent to at least the remaining portion of each of the food products to form a first fold in each of the food products when disposed on the platform, downstream of the folding of the first fold of the food products sequentially revolving each of the food products by revolving the rotatable platforms from the position in which each of the food products were first folded to a position in which the first fold is disposed substantially transverse to the length of the run, sequentially swinging oppositely disposed peripheral portions of the rotatable platforms for folding the food products to form spaced apart second and third folds in each of the food products which are transverse to and intersecting the first fold of each of the food products and extending parallel to the length of the run, transferring each of the thrice folded food products from the run to an additional run extending in the direction of the run and having an entrance portion adjacent the exit portion of the run; and sequentially turning the thrice-folded food products around a substantially horizontal axis extending transverse to the length of the additional run with the portion of the thrice-folded food product adjacent thereto being turned above the second and third folds in a direction opposite to the line of travel of the additional run when thrice folded food products are transferred to the additional run to complete the folding and tightening of the thrice-folded food products adjacent to the exit portion of the additional run.

2. A method for forming folded food products in accordance with claim 1 in which the step of transferring the thrice-folded food products from the run to an additional run having an entrance portion adjacent the exit portion of the run comprises transferring the thrice folded food products to an additional run having a predetermined surface speed in the direction of the run, and in which the step of sequentially turning the thrice-folded food products around a substantially horizontal axis extending transverse to the length of the additional run when a thrice-folded food product is transferred to the additional run to complete the folding of the thrice-folded food products adjacent the exit portion of the additional run, comprises turning the thrice-folded products with a surface speed slightly faster than the predetermined surface speed of the additional conveyor to tighten the thrice-folded food products.

3. A method for forming folded food products comprising the steps of conveying a series of food products on an exposed upper run of an endless conveyor extending horizontally, the upper run having an entrance portion, an intermediate portion downstream of the entrance portion, and an exit portion downstream of the intermediate portion, the upper run advancing from entrance portion toward the exit portion, the endless conveyor having a plurality of platform assemblies each being pivotally mounted on the conveyor about a substantially vertical axis when on the upper run, each of the platform assemblies being spaced apart from another along the length of the conveyor, placing each of the food products in flat form on each of the plurality of platform assemblies when adjacent the entrance portion of the upper run of the conveyor, sequentially swinging a peripheral portion of the platform assemblies for swinging a portion of the food products with respect to the platform assembly about an axis extending parallel to the length of the conveyor to a position overlying and adjacent to at least the remaining portion of the food products, the swinging of the portion of the food products forming a first fold in the food products;

downstream of the swinging of a portion of the food products revolving each of the food products by rotating each of the platform assemblies upon which each of the food product have been placed to a position in which the first fold is disposed substantially transverse to the run of the conveyor;

downstream of the revolving of the food products swinging oppositely disposed peripheral portions of the platform assemblies for rotating each of a pair of oppositely disposed portions of the food products with respect to the platform assembly about axes extending parallel to the length of the conveyor to a position overlying at least a portion of the food products, the rotating of each of the pair of oppositely disposed portions forming spaced apart second and third folds in the food products which are transverse to and intersecting the first fold of the food products, transferring the thrice-folded food products from the exit portion of the conveyor to an upper run of an additional conveyor adjacent the entrance portion thereof; and at an intermediate portion of the upper run of the additional conveyor folding the thrice-folded food products around a substantially horizontal axis extending transverse to the length of the upper run of the additional conveyor with the portion of the thrice-folded product adjacent the first fold being turned above the second and third folds in a direction opposite to the line of travel of the upper run of the additional conveyor to complete the folding of the thrice-folded food products around a substantially horizontal axis extending transverse to the length of the upper run of the additional conveyor to complete the folding of the thrice-folded food products adjacent the exit portion of the upper run of the additional conveyor.

4. A method for forming folded food products in accordance with claim 3 in which the step of transferring the thrice-folded food products from the exit portion of the conveyor to the upper run of an additional conveyor adjacent the entrance portion thereof comprises transferring the thrice-folded food products to an additional conveyor having a predetermined surface speed, and in which the step at an intermediate portion of the upper run of the additional conveyor of folding the thrice-folded food products around a substantially horizontal axis extending transverse to the length of the upper run of the additional conveyor to complete the folding of the thrice-folded food products adjacent the exit portion of the upper run of the additional conveyor comprises turning the thrice-folded products with a surface speed slightly faster than the predetermined surface speed of the additional conveyor to tighten the thrice-folded food products.

5. A method for forming burritos each having a folded shell and a filling thereon comprising the steps of conveying a series of shell and filling disposed on a rotatable platform spaced apart from the platform adjacent thereto along a run of spaced rotatable platforms extending in a horizontal plane and having an entrance portion, an intermediate portion downstream of the entrance portion, and an exit portion downstream of the intermediate portion, the shells and filling being conveyed from the entrance portion toward the exit portion of the run, each of the shells and filling being spaced apart from one another along the length of the run, the shells to be folded being introduced in flat form to the entrance portion of the run, downstream from the entrance portion sequentially swinging a peripheral portion of the rotatable platforms for sequentially folding a portion of the shells from a substantially horizontal position to a position overlying and adjacent to at least the remaining portion of the shells with the filling thereon to form a first fold in the shells when disposed on the platform, downstream of the folding of the first fold of the shells sequentially revolving each of the shells from the position in which the shells were first folded to a position in which the first fold is disposed substantially transverse to the length of the run, sequentially swinging oppositely disposed peripheral portions of the rotatable platforms for sequentially folding the shells to form spaced apart second and third folds in the shells which are transverse to and intersecting the first fold of the shells, transferring the thrice-folded shells from the run to an additional run extending in the direction of the run and having an entrance portion adjacent the exit portion of the run; and sequentially turning the thrice-folded shells around a substantially horizontal axis extending transverse to the length of the additional run with the portion of the thrice-folded shells adjacent the first fold being turned above the second and third folds in a direction opposite to the line of travel of the additional run when the thrice-folded shell are transferred to the additional run to complete the folding and tightening of the thrice-folded shells and thereby forming of the burrito adjacent the exit portion of the additional run.

6. A method for forming burritos in accordance with claim 5 in which the step of transferring the thrice-folded shells from the run to an additional run having an entrance portion adjacent the exit portion of the run comprises transferring the thrice folded shells to an additional run having a predetermined surface speed, and in which the step of sequentially turning the thrice-folded shells around a substantially horizontal axis extending transverse to the length of the additional run when the thrice-folded shells are transferred to the additional run to complete the folding of the thrice-folded shells adjacent the exit portion of the additional run, comprises turning the thrice-folded product with a surface speed slightly faster than the predetermined surface speed of the additional conveyor to tighten the folded shells and thereby tighten the burritos.

7. A machine for forming folded food products comprising, an elongated frame extending throughout the length of the machine; an endless conveyor mounted upon and extending along the length of the frame, the conveyor having an exposed upper run extending horizontally in a plane adjacent an upper portion of the machine, the upper run having an entrance portion, an intermediate portion downstream of the entrance portion, and an exit portion downstream of the intermediate portion;

means for driving the conveyor with the upper run advancing from the entrance portion toward the exit portion;

a plurality of platform assemblies each being pivotally mounted on the conveyor about a substantially vertical axis when on the upper run, each of the platform assemblies being spaced apart from another along the length of the conveyor, having a substantially horizontally extending planar base platform section when the platform assembly thereof is on the upper run, having a first movable platform section pivotally mounted about a pivotal axis extending adjacent to and parallel with respect to an edge portion of the planar base platform section, and having a pair of second movable platform sections oppositely disposed with respect to one another, each second movable platform section being pivotally mounted about substantially parallel pivotal axes with respect to a different oppositely disposed edge portion of the planar base platform section, the substantially parallel pivotal axes of the second movable platform section extending substantially perpendicular to the pivotal axis of the first movable platform section, each of the plurality of platform assemblies when adjacent the entrance portion of the upper run of the conveyor for receiving a flat food product to be folded, the pivotal axis of the first movable platform section being in line with and the pivotal axis of each of the second movable platform sections being substantially transverse to the length of the conveyor when a platform assembly is adjacent the entrance portion;

means disposed on the upper run of the conveyor downstream from the entrance portion for sequentially swinging the first movable platform section from a substantially horizontal position to a position overlying and adjacent to at least a portion of the planar base platform section and at least a portion of each of the second movable platform sections, the swinging of the first movable platform section forming a first fold in a food product when disposed on the platform assembly, means disposed adjacent the upper run of the conveyor downstream of the swinging means for sequentially returning the first movable platform section to a substantially horizontal position, means disposed downstream of the returning means for sequentially revolving each of the platform assemblies from the position in which the pivotal axis of the first movable platform is rotated to a position substantially transverse to the length of the conveyor and the pivotal axis of each of the second movable platform sections is rotated to be substantially parallel to the length of the conveyor, means disposed downstream of the revolving means for rotating each of the pair of second movable platform sections to a position overlying and adjacent to at least a portion of the planar base platform section, the rotating of each of the pair of second movable platform sections being adapted to form spaced apart second and third folds in a food product which are transverse to the first fold in a food product when disposed on the planar base portion;

means disposed downstream of the rotating means for returning each of the second movable platform sections to a substantially horizontal position, an additional endless conveyor extending for a predetermined length in line with the endless conveyor downstream from the exit portion of the endless conveyor, the additional endless conveyor having an upper run extending horizontally in an additional plane disposed lower than the plane of the upper run of the conveyor, the upper run of the additional conveyor having an entrance portion adjacent to the exit portion of the conveyor, an intermediate portion downstream of the entrance portion, and an exit portion downstream of the intermediate portion, means adjacent to the exit portion of the conveyor for transferring a thrice-folded food product from the platform assembly when a folded food product is disposed thereon to the upper run of the additional conveyor adjacent the entrance portion thereof; and means disposed adjacent the intermediate portion of the upper run of the additional conveyor for folding the thrice-folded food product around a substantially horizontal axis extending transverse to the length of the upper run of the additional conveyor when a thrice-folded food product is transferred to the upper run by the transferring means to complete the folding of the thrice-folded food product adjacent the exit portion of the upper run of the additional conveyor.

8. A machine for forming folded food products in accordance with claim 7 in which the additional endless conveyor extending for a predetermined length in line with the endless conveyor downstream from the exit portion of the endless conveyor has a predetermined surface speed, and in which the means disposed adjacent the intermediate portion of the upper run of the additional conveyor for folding the thrice-folded food product around a substantially horizontal axis extending transverse to the length of the upper run of the additional conveyor folds the thrice-folded food products with a surface speed slightly great than the surface speed of the additional conveyor to tighten the thrice-folded product when completing the folding of the thrice-folded food product adjacent the exit portion of the upper run of the additional conveyor.

9. A machine for forming folded food products comprising, an elongated frame extending throughout the length of the machine;

a plurality of endless conveyors mounted upon and extending along the length of the frame parallel to one another, each conveyor having an exposed upper run extending horizontally in a plane adjacent the upper portion of the machine, the upper run having an entrance portion, an intermediate portion downstream of the entrance portion, and an exit portion downstream of the intermediate portion;

means for driving the conveyors with the upper run advancing from the entrance portion toward the exit portion;

a plurality of platform assemblies each being pivotally mounted on each of the conveyors about a substantially vertical axis when on the upper run, each of the platform assemblies being spaced apart from another along the length of the conveyor, having a substantially horizontally extending planar base platform section when the platform assembly thereof is on the upper run, having a first movable platform section pivotally mounted about a pivotal axis extending adjacent to and parallel with respect to an edge portion of the planar base platform section, and having a pair of second movable platform sections oppositely disposed with respect to one another, each second movable platform section being pivotally mounted about substantially parallel pivotal axes with respect to a different oppositely disposed edge portion of the planar base platform section, the substantially parallel pivotal axes of the second movable platform section extending substantially perpendicular to the pivotal axis of the first movable platform section, each of the plurality of platform assemblies when adjacent the entrance portion of the upper run of the conveyor for receiving a flat food product to be folded, the pivotal axis of the first movable platform section being in line with and the pivotal axis of each of the second movable platform sections being substantially transverse to the length of the conveyor when a platform assembly is adjacent the entrance portion;

means disposed on the upper run of each of the conveyors downstream from the entrance portion for sequentially swinging the first movable platform section from a substantially horizontal position to a position overlying and adjacent to at least a portion of the planar base platform section and at least a portion of each of the second movable platform sections, the swinging of the first movable platform section forming a first fold in a food product when disposed on the platform assembly, means disposed adjacent the upper run of each of the conveyors downstream of the swinging means for sequentially returning the first movable platform section to a substantially horizontal position, means disposed downstream of each of the returning means for sequentially revolving each of the platform assemblies from the position in which the pivotal axis of the first movable platform is rotated to a position substantially transverse to the length of the conveyor and the pivotal axis of each of the second movable platform sections is rotated to be substantially parallel to the length of the conveyor, means disposed downstream of the revolving means of each conveyor for rotating each of the pair of second movable platform sections to a position overlying and adjacent to at least a portion of the planar base platform section, the rotating of each of the pair of second movable platform sections being adapted to form spaced apart second and third folds in a food product which are transverse to the first fold in a food product when disposed on the planar base portion;

means disposed downstream of the rotating means of each conveyor for returning each of the second movable platform sections to a substantially horizontal position, additional endless conveyors extending for a predetermined length in line with each of the endless conveyors downstream from the exit portion of the endless conveyors, the additional endless conveyors each having an upper run extending horizontally in an additional plane disposed lower than the plane of the upper run the conveyor, the upper run of each of the additional conveyors having an entrance portion adjacent to the exit portion of the conveyor, an intermediate portion downstream of the entrance portion, and an exit portion downstream of the intermediate portion, means adjacent to the exit portion of each of the conveyors for transferring a thrice-folded food product from the platform assembly when a folded food product is disposed thereon to the upper run of the additional conveyor adjacent the entrance portion thereof; and means disposed adjacent the intermediate portion of the upper run of each of the additional conveyors for folding the thrice-folded food product around a substantially horizontal axis extending transverse to the length of the upper run of the additional conveyor when a thrice-folded food product is transferred to the upper run by the transferring means to complete the folding of the thrice-folded food product adjacent the exit portion of the upper run of the additional conveyor.

10. A machine for forming folded food products in accordance with claim 9 in which the additional endless conveyors extending for a predetermined length in line with each of the endless conveyors downstream from the exit portion of the endless conveyors has a predetermined surface speed, and in which the means disposed adjacent the intermediate portion of the upper run of each of the additional conveyors for folding the thrice-folded food product around a substantially horizontal axis extending transverse to the length of the upper run of the additional conveyor folds the thrice-folded food product at a surface speed thereof slightly faster than the surface speed of the additional conveyor to tighten the thrice-folded food product when completing the folding of the thrice-folded food product adjacent the exit portion of the upper run of the additional conveyor.

11. A machine for forming burritos in accordance with claim 9 in which the additional endless conveyors extending for a predetermined length in line with each of the endless conveyors downstream from the exit portion of the endless conveyors has a predetermined surface speed, and in which the means disposed adjacent the intermediate portion of the upper run of each of the additional conveyors for folding the thrice-folded shell around a substantially horizontal axis extending transverse to the length of the upper run of the additional conveyor folds the thrice-folded shell at a surface speed thereof slightly faster than the surface speed of the additional conveyor to tighten the thrice-folded shell when completing the folding of the thrice-folded shell into a burrito adjacent the exit portion of the upper run of the additional conveyor.

12. A machine for forming burritos each having a shell and filling thereon comprising, an elongated frame extending throughout the length of the machine;

a plurality of endless conveyors mounted upon and extending along the length of the frame parallel to one another, each conveyor having an exposed upper run extending horizontally in a plane adjacent the upper portion of the machine, the upper run having an entrance portion, an intermediate portion downstream of the entrance portion, and an exit portion downstream of the intermediate portion;

means for driving the conveyors with the upper run advancing from the entrance portion toward the exit portion;

a plurality of platform assemblies each being pivotally mounted on each of the conveyors about a substantially vertical axis when on the upper run, each of the platform assemblies being spaced apart from another along the length of the conveyor, having a substantially horizontally extending planar base platform section when the platform assembly thereof is on the upper run, having a first movable platform section pivotally mounted about a pivotal axis extending adjacent to and parallel with respect to an edge portion of the planar base platform section, and having a pair of second movable platform sections oppositely disposed with respect to one another, each second movable platform section being pivotally mounted about substantially parallel pivotal axes with respect to a different oppositely disposed edge portion of the planar base platform section, the substantially parallel pivotal axes of the second movable platform section extending substantially perpendicular to the pivotal axis of the first movable platform section, each of the plurality of platform assemblies when adjacent the entrance portion of the upper run of the conveyor receiving a shell to be folded, the pivotal axis of the first movable platform section being in line with and the pivotal axis of each of the second movable platform sections being substantially transverse to the length of the conveyor when a platform assembly is adjacent the entrance portion;

means disposed on the upper run of each of the conveyors downstream from the entrance portion for sequentially swinging the first movable platform section from a substantially horizontal position to a position overlying and adjacent to at least a portion of the planar base platform section and at least a portion of each of the second movable platform sections, the swinging of the first movable platform section forming a first fold in a shell when disposed on the platform assembly, means disposed adjacent the upper run of each of the conveyors downstream of the swinging means for sequentially returning the first movable platform section to a substantially horizontal position, means disposed downstream of each of the returning means for sequentially revolving each of the platform assemblies from the position in which the pivotal axis of the first movable platform is rotated to a position substantially transverse to the length of the conveyor and the pivotal axis of each of the second movable platform sections is rotated to be substantially parallel to the length of the conveyor, means disposed downstream of the revolving means of each conveyor for rotating each of the pair of second movable platform sections to a position overlying and adjacent to at least a portion of the planar base platform section, the rotating of each of the pair of second movable platform sections being adapted to form spaced apart second and third folds in a shell which are transverse to the first fold in the shell when disposed on the planar base portion;

means disposed downstream of the rotating means of each conveyor for returning each of the second movable platform sections to a substantially horizontal position, additional endless conveyors extending for a predetermined length in line with each of the endless conveyors downstream from the exit portion of the endless conveyors, the additional endless conveyors each having an upper run extending horizontally in an additional plane disposed lower than the plane of the upper run the conveyor, the upper run of each of the additional conveyors having an entrance portion adjacent to the exit portion of the conveyor, an intermediate portion downstream of the entrance portion, and an exit portion downstream of the intermediate portion, means adjacent to the exit portion of each of the conveyors for transferring a thrice-folded shell from the platform assembly when the thrice-folded shell is disposed thereon to the upper run of the additional conveyor adjacent the entrance portion thereof; and means disposed adjacent the intermediate portion of the upper run of each of the additional conveyors for folding the thrice-folded shell around a substantially horizontal axis extending transverse to the length of the upper run of the additional conveyor when a thrice-folded shell is transferred to the upper run by the transferring means to complete the folding of the thrice-folded shell into a burrito adjacent the exit portion of the upper run of the additional conveyor.

\* \* \* \* \*